(12) United States Patent
Backfolk et al.

(10) Patent No.: US 10,927,505 B2
(45) Date of Patent: Feb. 23, 2021

(54) PRECIPITATED CALCIUM CARBONATE

(71) Applicant: Stora Enso OYJ, Helsinki (FI)

(72) Inventors: Kaj Backfolk, Villmanstrand (FI); Isto Heiskanen, Imatra (FI); Teija Laukala, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 36 days.

(21) Appl. No.: 16/076,976

(22) PCT Filed: Feb. 10, 2017

(86) PCT No.: PCT/IB2017/050741
§ 371 (c)(1),
(2) Date: Aug. 9, 2018

(87) PCT Pub. No.: WO2017/137941
PCT Pub. Date: Aug. 17, 2017

(65) Prior Publication Data
US 2019/0063000 A1   Feb. 28, 2019

(30) Foreign Application Priority Data
Feb. 12, 2016  (SE) ...................................... 1650193

(51) Int. Cl.
*D21H 17/67* (2006.01)
*C01F 11/18* (2006.01)
*D21H 17/63* (2006.01)
*C09C 1/02* (2006.01)

(52) U.S. Cl.
CPC .......... *D21H 17/675* (2013.01); *C01F 11/18* (2013.01); *C09C 1/021* (2013.01); *D21H 17/63* (2013.01); *C01P 2002/88* (2013.01); *C01P 2004/03* (2013.01); *Y02P 20/141* (2015.11)

(58) Field of Classification Search
None
See application file for complete search history.

(56) References Cited

U.S. PATENT DOCUMENTS

| | | | | |
|---|---|---|---|---|
| 5,223,090 A * | 6/1993 | Klungness | ............ | D21C 9/004 162/9 |
| 5,679,220 A * | 10/1997 | Matthew | ............... | D21H 17/70 162/158 |
| 6,251,222 B1 | 6/2001 | Silenius et al. | | |
| 2003/0094252 A1 * | 5/2003 | Sundar | ................... | D21H 17/70 162/128 |
| 2004/0247513 A1 | 12/2004 | Huhn, III | | |

(Continued)

FOREIGN PATENT DOCUMENTS

| CN | 1829663 A | 12/2008 |
|---|---|---|
| CN | 105121741 | 12/2015 |

(Continued)

OTHER PUBLICATIONS

Cölfen H, Antonietti M. Mesocrystals and Nonclassical Crystallization. England: Chichester; 2008.

(Continued)

*Primary Examiner* — Dennis R Cordray
(74) *Attorney, Agent, or Firm* — Greer, Burns & Crain, Ltd.

(57) ABSTRACT

The present invention relates to crystalline and stable amorphous $CaCO_3$ precipitated on lignocellulosic fibers.

14 Claims, 4 Drawing Sheets

(56) References Cited

U.S. PATENT DOCUMENTS

| | | | |
|---|---|---|---|
| 2009/0114356 | A1 | 5/2009 | Silenius |
| 2010/0212853 | A1 | 8/2010 | Klungness |
| 2015/0315748 | A1 | 11/2015 | Imppola et al. |

FOREIGN PATENT DOCUMENTS

| | | | |
|---|---|---|---|
| EP | 0594332 A1 * | 4/1994 | |
| JP | 2008544104 A | 12/2008 | |
| WO | 199951691 | 10/1999 | |
| WO | 2003033815 | 4/2003 | |
| WO | 2014072912 | 5/2014 | |

OTHER PUBLICATIONS

Haleem N, Arshadm M, Shahid M., Tahir M.A, 2014. Synthesis of Carboxymethyl cellulose from waste of cotton ginning industry. Carbohydrate Polymers, 113, 249-255.

Obi Reddy K, Zhang J, Zhang, J, Varada Rajulu A, 2014. Preparation and properties of self-reinforced cellulose composite films from Agave microfibrils using an ionic liquid. Carbohydrate polymers, 144, 537-545.

Park W.K, Ko S-J, Lee S.W, Cho K-H, Ahn J-W, Han C, 2008. Effects of magnesium chloride and organic additives on the synthesis of aragonite precipitated calcium carbonate. Journal of crystal growth, 310, 2593-2601.

Payne S.R, Heppenstall-Butler M., Butler M.F, 2007. Formation of Thin Calcium Carbonate Films on Chitosan Biopolymer Substrates. Crystal Growth & Design, 7(7), 1262-1276.

Renaudin G, Bertrand A, Dubois M, Gomes S, Chevalier P, Labrosse P, 2008. A study of water releases in ground (GCC) and precipitated (PCC) calcium carbonates. Journal of Physics and Chemistry of Solids, 69, 1603-1614.

Saghavaz K.M, Resalati H, Mehrabi E, 2013. Characterization of cellulose-PCC composite filler synthesized from CMC and BSKP fibrils by hydrolysis of ammonium carbonate, Powder Technology, 246, 93-97.

Saito T, Oaki Y, Nishimura T, Isogai A, Kato T, 2014. Bioinspired stiff and flexible composites of nanocellulose-reinforced amorphous CaCO3. Material Horizons, 1, 321-325.

Ulčinas A, Butler M.F, Heppenstall-Butler M, Singleton S, Miles M.J, 2007. Direct observation of spherulitic growth stages of CaCO3 in a poly(acrylic acid)—chitosan system: In situ SPM study. Journal of Crystal Growth, 307, 378-385.

Watamura H, Sonobe Y, Hirasawa I, 2014. Polyacrylic Acid-Assisted Crystallization Phenomena of Carbonate Crystals, Chemical Engineering & Technology, 37(8), 1422-1426.

Vdović N, Kralj D, 2000. Electrokinetic properties of spontaneously precipitated calcium carbonate polymorphs: the influence of organic substances. Colloids and Surfaces, 161 499-505.

Wei H, Shen Q, Zhao Y, Zhou Y, Wang D, Xu D, 2005. On the crystallization of calciumcarbonate modulated by anionic surfactants. Journal of Crystal Growth, 279, 439-446.

Volkmer D, Harms M, Gower L, Ziegler A, 2005. Morphosynthesis of Nacre-Type Laminated CaCO3 Thin Films and Coatings. Angewandte Chemie International Edition, 44, 639-644.

Yu J, Lei M, Cheng B, Zhao X, 2004. Effects of PAA additive and temperature on morphology of calcium carbonate particles. Journal of Solid State Chemistry, 177, 681-689.

Kitamura M, Konno H, Yasu A, Masuoka H, 2002. Controlling factors and mechanism of reactive crystallization of calcium carbonate polymorphs from calcium hydroxide suspensions. Journal of crystal growth, 2002, 323-332.

Klungness J.H, Ahmed A, Ross-Sutherla N, AbuBakr S, 2000. Lightweight, high-opacity paper by fiber loading: filler comparison. Nordic Pulp and Paper Research Journal (15)5, 345-350.

Klungness J.H, Caulfield D, Sachs I., Tan F, Sykes M, Shilts R, 1994. Fiber-loading: a progress report. Tappi Recycling symposium (pp. 283-290). Boston: Tappi Press.

Klungness J.H, Sykes M. S, Tan F, Abubakr S, Eisenwasser, J. D, 1996. Effect of fiber loading on paper properties. Tappi Journal, 79(3), 297-301.

Klungness J.H, Tan F, Aziz S. Sykes M.S. Retention of calcium carbonate during recycling: direct loading versus fiber oading. In: Environmental Conference & Exhibit Book 1: May 5-7, 1997; Minneapolis. Atlanta: Tappi Press; 1997.

Kumar P, Gautam S.K, Kumar V, Singh S.P, 2009. Enhancement of optical properties of bagasse pulp by in-situ filler precipitation. BioResources, 4(4), 1635-1646.

Kumar P, Singh Negi Y, Pal Singh S, 2011. Filler loading in the lumen or/and cell wall of fibers—a literature review. BioResources 6(3) 3526-3546.

López-Periago A.M, Pacciani R, Cracía-González C, Vega L.F, Domingo C, 2010. A Breakthrough technique for the preparation of high-yield precipitated calcium carbonate. Journal of Supercritical Fluids, 52, 298-305.

Malkaj P, Dalas E, Kanellopoulou D.G, Chrissanthopoulos A, Sevastos D, 2007. Calcite particles formation, in the presence of soluble polyvinyl-alcohol matrix. Powder Technology, 177, 71-76.

Matahwa H, Ramiah V, Sanderson R.D, 2008. Calcium carbonate crystallization in the presence of modified polysaccharides and linear polymeric additives. Journal of Crystal Growth, 310, 4561-4569.

Mohamadzadeh-Saghavaz K, Resalati H, & Ghasemian A., 2014. Cellulose-precipitated calcium carbonate composites and their effect on paper properties. Chemical Papers, 68(6) 774-781.

Nielsen J.W, Sand K.K, Pedersen C.S, Lakshtanov L.Z, Winther J.R, Willemoës M, Stipp S.L.S, 2012. Polysaccharide Effects on Calcite Growth: The Influence of Composition and Branching. Crystal Growth & Design, 12, 4906-4910.

Ouhenia S, Chateigner D, Blekhir M.A, Guilmeau E, Krauss C, 2008. Synthesis of calcium carbonate polymorhs in the presence of polyacrylic acid. Journal of Crystal Growth, 310, 2832-2841.

Silenius P. Preparation of filler containing papermaking materials by precipitating calcium carbonate in-situ in the presence of cellulosic material [Licentiate thesis]. Lappeenranta: Lappeenranta University of Technology; 1996.

Subramanian R, Fordsmand H, Paulapuro H, 2007. Precipitated calcium carbonate (PCC)-cellulose composite fillers; affect of PCC particle structure on the production and properties of uncoated fine paper. BioResources, 2(1), 91-105.

Tibolla H, Franciele M.P, Florencia C.M, 2014. Cellulose nanofibers produced from banana peel by chemical and enzymatic treatment. LWT—Food Science and Technology, 59, 1311-1318.

International Searching Authority, Written Opinion of the International Searching Authority, PCT/IB2017/050741, dated Aug. 17, 2017.

International Searching Authority, International Search Report, PCT/IB2017/050741, dated Apr. 19, 2017.

Butler, Michael F. et al., "Calcium Carbonate Crystallization in the Presence of Biopolymers," Crystal Growth & Design, 2006, vol. 6, No. 3, 781-794.

Cai, Guo-Bin, et al., "Synthesis of Polyacrylic Acid Stabilized Amorphous Calcium Carbonate Nanoparticles and Their Application for Removal of Toxic Heavy Metal Ions in Water," Journal of Physical Chemistry, 2010, No. 114, 12948-12954.

Ciobanu M, Bobu E, Ciolacu F., 2010. In-situ cellulose fibres loading with calcium carbonate precipitated by different methods. Cellulose Chemical Technology, 44, 379-387.

Gower L.B, Odom D.J, 2000. Deposition of calcium carbonate films by a polymer-induced liquid-precursor (PILP) process. Journal of Crystal Growth, 210, 719-734.

Hardikar V.V, Matijević E, 2001. Influence of ionic and nonionic dextrans on the formation of calcium hydroxide and calcium carbonate particles. Colloids and Surfaces, 186, 23-31.

Hosoda N, Kato T, 2001. Thin-Film Formation of Calcium Carbonate Crystals: Effects of Functional Groups of Matrix Polymers. Chemistry of Materials, 13, 688-693.

Hu Z, Deng Y, 2004. Synthesis of needle-like aragonite from calcium chloride and sparingly soluble magnesium carbonate. Powder technology, 140, 10-16.

(56) References Cited

OTHER PUBLICATIONS

Huang S-C, Naka K, Chujo Y, 2007. A Carbonate Controlled-Addition Method for Amorphous Calcium Carbonate Spheres Stabilized by Poly(acrylic acid)s , Langmuir, 23, 12086-12095.

Huang S-C, Naka K, Chujo Y, 2008. Effect of Molecular Weights of Poly(acrylic acid) on Crystallization of Calcium Carbonate by the Delayed Addition Method, 2008. Polymer Journal, 40(2) 154-162.

Jada A., Ait Akbour R, Jacquemet C, Suau J.M, Guerret O, 2007. Effect of sodium polyacrylate molecular weight on the crystallogenesis of calcium carbonate. Journal of Crystal Growth, 306, 373-382.

Kellermeier M., Melero-García E, Glaab F, Klein R, Drechsler M, Rachel R, Garcí-Ruiz J, Kunz W, 2010. Stabilization of Amorphous Calcium Carbonate in Inorganic Silica-Rich Environments. Journal of the American Chemical Society, 132, 17859-17866.

Kim H.K, Park S.J, Han J.I, Lee H.K, 2013. Microbially mediated calcium carbonate precipitation on normal and lightweight concrete. Construction and Building Materials, 38, 1073-1082.

Kirboga S, Oner M, Akoyl E, 2014. The effect of ultrasonication on calcium carbonate crystallization in the presence of biopolymer. Journal of Crystal Growth, 401, 266-270.

\* cited by examiner

PRECIPITATED CALCIUM CARBONATE

This application is a U.S. National Phase under 35 U.S.C. § 371 of International Application No. PCT/IB2017/050741, filed Feb. 10, 2017, which claims priority under 35 U.S.C. §§ 119 and 365 to Swedish Application No. 1650193-4, filed Feb. 12, 2016.

FIELD OF THE INVENTION

The present invention relates to crystalline and stable amorphous calcium carbonate ($CaCO_3$) precipitated on lignocellulosic fibers.

Background

Minerals can be fixed onto lignocellulose by various methods using modified pigments, by co-mixing with flocculation or fixation chemicals, or by direct or in-situ precipitation via various precursors. When calcium carbonate is precipitated in-situ onto cellulose fibers during paper manufacturing, a unique composite material is obtained. This leads to a pulp furnish and engineered fibers with a high filler content (Ciobanu et. al., 2010), high filler retention (Ciobanu et. al., 2010; Klungness et. al. 1997; Silenius, 1996) and a more uniform distribution of filler material within the sheet (Mohamadzadeh-Saghavaz et. al., 2014; Silenius, 1996), which results in improved optical properties without any pronounced loss of strength (Ciobanu et. al., 2010; Klungness et. al. 2000; Mohamadzadeh-Saghavaz et. al., 2014). Hence, the in-situ precipitation of calcium carbonate has gained interest in the paper industry for high filler-content papers, although the full-scale implementation of the concept still poses technological challenges.

Calcium carbonate, $CaCO_3$, can be precipitated onto fiber surfaces by the carbonization of calcium hydroxide, $Ca(OH)_2$, in the presence of fibers (Ciobanu et. al., 2010; Klungness et. al., 1994, 1996; Subramanian et. al., 2007) or by reactions between electrolytes that contain calcium and carbonate (Ciobanu et. al., 2010; Kumar et. al., 2009; Mohamadzadeh-Saghavaz et. al., 2014). Conflicting results from studies on the in-situ precipitation of $CaCO_3$ together with fibers have however been presented.

Both increase in opacity (Ciobanu et. al., 2010) and increase in brightness (Mohamadzadeh-Saghavaz et. al., 2014) as well as a decrease in opacity (Klungness et. al., 1994, 2000; Kumar et. al., 2009; Mohamadzadeh-Saghavaz et. al., 2014), and decrease in brightness (Klungness et. al., 1994, 1996, 2000; Kumar et. al., 2009) and a decrease in whiteness (Klungness et. al., 1996, 2000) have been reported. Similarly, some studies have shown a decrease in tensile strength or tensile index (Ciobanu et. al., 2010; Kumar et. al., 2009; Silenius, 1996), and others an increase in tensile strength (Klungness et. al., 1994, 2000; Mohamadzadeh-Saghavaz et. al., 2014), bursting strength (Klungness et. al., 1994; Mohamadzadeh-Saghavaz et. al., 2014) and tearing resistance (Klungness et. al., 1994). Some of the contradictory results have been linked to the different materials used in the experiments. The decreases observed in whiteness and brightness have been linked to a reaction between alkali and residual lignin (Klungness et. al., 1996, 2000), and the same precipitation processes have been reported to result in different property changes for different types of fiber (Klungness et. al., 2000; Kumar et. al., 2009). Commercial precipitated calcium carbonates, PCCs, have been optimized for light scattering by tuning their crystal morphology and particle size, whereas calcium carbonate precipitated in-situ has not been similarly controlled and optimized (Klungness et. al., 1994).

In the absence of lignocellulosic fibers, many different ways of controlling PCC morphology and particle size have been presented in the literature, including controlling the ratio of carbonate to calcium ions (Kitamura et. al., 2002), the use of crystallization-controlling agents such as polymers (Butler et. al., 2006; Hardikar & Matijević, 2001; Kumar et. al., 2011; Matahwa et. al., 2008; Nielsen, et. al., 2012; Jada et. al., 2007), organic acids (Vdović & Kralj, 2000), surfactants (Wei et. al., 2005) and inorganic compounds such as magnesium carbonate (Hu & Deng, 2004), magnesium chloride (Park et. al., 2008) and sodium silicate (Kellermeier et. al., 2010). Crystallization-controlling agents are reported to affect all phases of crystal formation of $CaCO_3$, i.e. from nucleation and precursors to crystal growth and agglomeration (Cölfen & Antonietti, 2008).

An interesting property of some crystallization-controlling agents is that they may interact with functional groups of the template material, such as cellulose. This interaction is of particular interest when, for example, calcium carbonate is precipitated onto cellulose fibers, since the effect of polymeric additives in a modified precursor system is not well understood in the cellulosic fiber-$Ca(OH)_2$—$CO_2$ system. However, Hosoda and Kato (2011) used the controlled interaction between carboxyl groups of PAA and hydroxyl groups on cellulose and obtained a continuous, thin calcite film on the cellulosic surface crystallized from a supersaturated $CaCO_3$ solution. They concluded that the thin-film formation was a combined effect of interactions between the carboxyl groups of the polyacrylic acid and the hydroxyl or amino groups in the polymers, and the ability of PAA to inhibit crystallization in bulk solution.

The documents discussed above reveal that there is not technical solution to prepare amorphous PCC-fiber complexes or composite materials.

SUMMARY OF THE INVENTION

The present invention is directed to a method for preparing stable amorphous calcium carbonate precipitated on natural fibers comprising the steps of
a) mixing water, 0 to 120 wt-% (based on the fiber weight) of at least one highly charged anionic polymer in solution, 1-100 wt-% (based on the total dry weight of the batch) $Ca(OH)_2$ and 0.1 to 95 wt-% (based on the total dry weight of the batch) of natural fibers;
b) feeding $CO_2$ to the mixture of step a) during stirring to obtain a precipitation;
c) drying the mixture or filtering the precipitated solids obtained in step b).

In one embodiment of the present invention, 60-80 wt-% of $Ca(OH)_2$ and 40-120 wt-% of highly charged anionic polymer is used in step a).

In one embodiment of the present invention, the highly charged anionic polymer is polyacrylic acid or a salt thereof. In one embodiment, the highly charged anionic polymer is sodium polyacrylic acid.

In one embodiment of the present invention, 0.1 to 90 wt-% of lignocellulosic fibers is used as natural fibers.

In one embodiment of the present invention, 0.1 to 80 wt-% of lignocellulosic fibers is used as natural fibers.

In one embodiment of the present invention, 0.1 to 60 wt-% of lignocellulosic fibers is used as natural fibers.

In one embodiment of the present invention, 0.1 to 50 wt-% of lignocellulosic fibers is used as natural fibers.

In one embodiment of the present invention, 0.1 to 40 wt-% of lignocellulosic fibers is used as natural fibers.

In one embodiment of the present invention, 0.1 to 30 wt-% of lignocellulosic fibers is used as natural fibers.

In one embodiment of the present invention, 0.1 to 20 wt-% of lignocellulosic fibers is used as natural fibers.

In one embodiment of the present invention, 0.1 to 10 wt-% of lignocellulosic fibers is used as natural fibers.

In one embodiment of the present invention, 0.5 to 5 wt-% of lignocellulosic fibers is used as natural fibers.

In one embodiment of the present invention, 0.5 to 1.5 wt-% of lignocellulosic fibers is used as the natural fibers.

In one embodiment of the present invention, 2.5 to 3.5 wt-% of lignocellulosic fibers is used as natural fibers.

In one embodiment of the present invention, the fibers used have not been surface modified. In one embodiment of the present invention, the fibers used are native or a main product or a byproduct from pulping, such as a byproduct from chemical or mechanical pulping.

In one embodiment of the present invention, said fiber is selected from microcrystalline cellulose, microfibrillated cellulose, nanocellulose, bacteria cellulose, cellulose nanocrystals or a mixture thereof.

One embodiment of the present invention is a lignocellulosic fiber on which calcium carbonate has precipitated, obtainable by the method according to the present invention.

One embodiment of the present invention is amorphous calcium carbonate precipitated on lignocellulosic fiber, characterized in that the calcium carbonate is essentially stable in the amorphous form. In one embodiment, said fiber has not been surface modified.

One embodiment of the present invention is amorphous calcium carbonate precipitated on lignocellulosic fiber, wherein less than 5% of said calcium carbonate has transitioned from amorphous to crystalline form after storing for a period of 30 days at room temperature.

In the papermaking field, PCC morphology and particle size are important factors governing filler performance. Morphology control is therefore an important factor in in-situ precipitation, but, to our knowledge, little effort has been made to improve PCC morphology control in cellulosic fiber-$Ca(OH)_2$—$CO_2$ systems, and the effect of PAA has not been investigated. In this work, in-situ precipitation of PCC onto cellulosic microfiber in the presence of PAA was performed using a batch reactor. The reaction between carbon dioxide and calcium hydroxide was varied to give different PCC morphologies depending on the concentrations of microfiber and PAA. It was demonstrated that the morphology of the PCC particles formed on the microfiber can be altered by changing the process parameters and the concentrations of calcium hydroxide and PAA.

The degree of distribution of PCC on the fiber surface with and without PAA depended on process conditions. The fiber concentration in the reactor was found to be important, both with and without PAA, which was partly ascribed to the degree of supersaturation during precipitation and to the aggregation and agglomeration of $CaCO_3$, but the concentrations of $Ca(OH)_2$ and PAA, and the ratio of the species were also important. The presence of an unstable ACC phase at beginning of the precipitation was suspected based on the behaviour of the pH. The use of high concentration of PAA revealed the probable formation of an ACC compound stable for a time of many months, which was supported by a combination of SEM imaging and XRD analysis.

The lignocellulosic fiber on which $CaCO_3$ has precipitated can also be used for example as a food ingredient, in tooth paste or other products for personal care, in transparent films and as an ingredient in a pharmaceutical product, including as an active pharmaceutical ingredient.

DETAILED DESCRIPTION

Materials and Methods

The calcium carbonate was precipitated at ambient temperature (20-23° C.) using $Ca(OH)_2$ as lime milk and $CO_2$ (AGA, purity 99.7%). A dry cellulosic microfiber (Arbocel UFC100, JRS), with a mean particle size of 8 μm according to the manufacturer was dispersed in water with strong mixing. Sodium polyacrylic acid, Na-PAA (Sigma-Aldrich, M ~1800 g/mol) was dissolved in water (2, 5 and 8 wt-%, using a concentration as low as possible to reach the targeted concentration in the reaction batch) and diluted with water immediately prior use.

The batches were prepared by mixing water, PAA solution (if used), $Ca(OH)_2$ and fibers, in this order. The contents of the solutions and suspensions were determined gravimetrically with an accuracy of ±0.5 g. The precipitation was performed in an open batch reactor equipped with mixer and inlet for $CO_2$. The stirring speed was set to a constant 800 rpm and the initial batch temperature was ca. 20° C. Changes in temperature and pH were monitored during the experiments, and the experiments were terminated when the pH began to stabilize at a low level, usually at ca. pH 6.5.

Most of the samples were dried in oven without filtration, but some samples made using PAA as an additive were filtered using a polycarbonate membrane (Whatman, 0.6 μm) and rinsed with distilled water (ca. 30° C.) before drying. The dried PCC-cellulose composite samples were studied using a Scanning Electron Microscope (FEI Nova NanoSEM 450 field emission (Schottky emitter) with a 10.0 kV accelerating voltage, 8 mm working distance and retractable concentric back scatter detector (CBS)). Ash contents were determined according to TAPPI standards T 211 om-02 and T 413 om-11, and thermogravimetric analysis (Mettler Toledo TGA/DSC 2) was performed on selected samples.

The morphology of the cellulose microfiber-PCC agglomerates and the size of PCC crystal on the cellulose were determined from the SEM images. The $CaCO_3$ polymorphs and the crystallinity of the cellulose-PCC complexes were characterized using x-ray diffraction (XRD measurements on a Bruker Discover D8 diffractometer (Karlsruhe, Germany) using Cu(Kα) radiation (λ=1.54184 nm). The XRD diffractograms were collected in the 2θ range of 13°-48°. The X-ray tube was operated at 40 kV and 40 mA. For phase identification, a PDF-2 database (2012) was used.

The variables relevant for the precipitating nanoclusters and crystals on the microfibers are listed and explained in Table I. Although the fiber appears to be a non-reactive component in the precipitation reaction, it plays an important but indirect role in the supersaturation of the solution, in addition to its ability to assist nucleation. This is explained as follows:

The $Ca(OH)_2$/fiber ratio at a given ash content and a given amount of fiber is decided by the targeted filler content of the fiber-PCC composite material according to the following equation, derived from the T 211 om-02 ash definition in TAPPI.

$$m_{Ca(OH)_2} = \frac{\text{Ash, \%} \cdot (B - A)}{100 - \text{Ash, \%}} \cdot 0.7402$$

Where A is the weight of ash targeted PCC ash, and B is the weight of the test specimen so that B-A is the weight of fiber. The constant 0.7402 is the ratio of the molar masses of $Ca(OH)_2$ and $CaCO_3$, to translate the targeted weight of PCC ash to the weight of $Ca(OH)_2$.

In the batch system used, increasing fiber concentration increases $Ca(OH)_2$ concentration when the targeted ash content is kept at constant. An increase in $Ca(OH)_2$ concentration can in turn affect the degree of supersaturation and the ratio of ionic species by offering reactive material for the precipitation. An important consequence is that when the "same" batch process is used for different targeted filler ash contents by simply changing the amount of added $Ca(OH)_2$ and perhaps the $CO_2$ feed, the PCC properties and thus the fiber furnish properties may change. Even if all the process parameters were changed so that the ratios were truly fixed, the precipitation process would still change with a change in the amount of $Ca(OH)_2$ added, as the driving force for precipitation is supersaturation that under given conditions depends on the concentration of the precipitating species. Changing the fiber concentration in order to fix the $Ca(OH)_2$ concentration would, instead, change the surface area of fiber per volume unit.

TABLE I

Variables investigated and units used. Ratios are calculated using the units given in the table.

| Variable | Clarification |
| --- | --- |
| $Ca(OH)_2$ concentration | Calcium hydroxide concentration in reaction mixture (wt-%, of batch before precipitation) |
| Microfiber concentration | Microfiber concentration in reaction mixture (wt-%, of batch before precipitation) |
| $CO_2$ feed | Carbon dioxide feed (l/min, at 20° C.) |
| PAA concentration | Concentration of additive (PAA) (wt-%, of fiber) |
| $Ca(OH)_2/CO_2$ | Ratio of calcium hydroxide concentration to carbon dioxide feed (wt-%/l/min) |
| $Ca(OH)_2$/fiber | Ratio of calcium hydroxide concentration and fiber concentration, (wt-%/wt-%) |
| $PAA/Ca(OH)_2$ | Ratio of additive concentration to calcium hydroxide concentration (wt-%/wt-%) |

Results
Effect of Microfiber Concentration and $CO_2$ Feed $CaCO_3$ was precipitated onto microfibers without polymeric additives at 5 different fiber concentrations, viz. 0.5, 1.0, 2.0, 3.0 and 6.0 wt-%. The targeted $Ca(OH)_2$ concentration was 69 wt-% based on oven-dry fiber. The precipitation gave on average 46.3 wt-% ash (mineral filler) content measured on unfiltered samples. In this case, mineral filler content and ash content are synonym, since microfiber gave no ash. The obtained ash gave a 91 mol-% conversion efficiency of $Ca(OH)_2$, based on weight loss (TAPPI standards T 211 om-02 and T 413 om-11 in conjunction) assuming that the lime milk was essentially free from impurities or reaction products such as $CaCO_3$.

Figure 1:
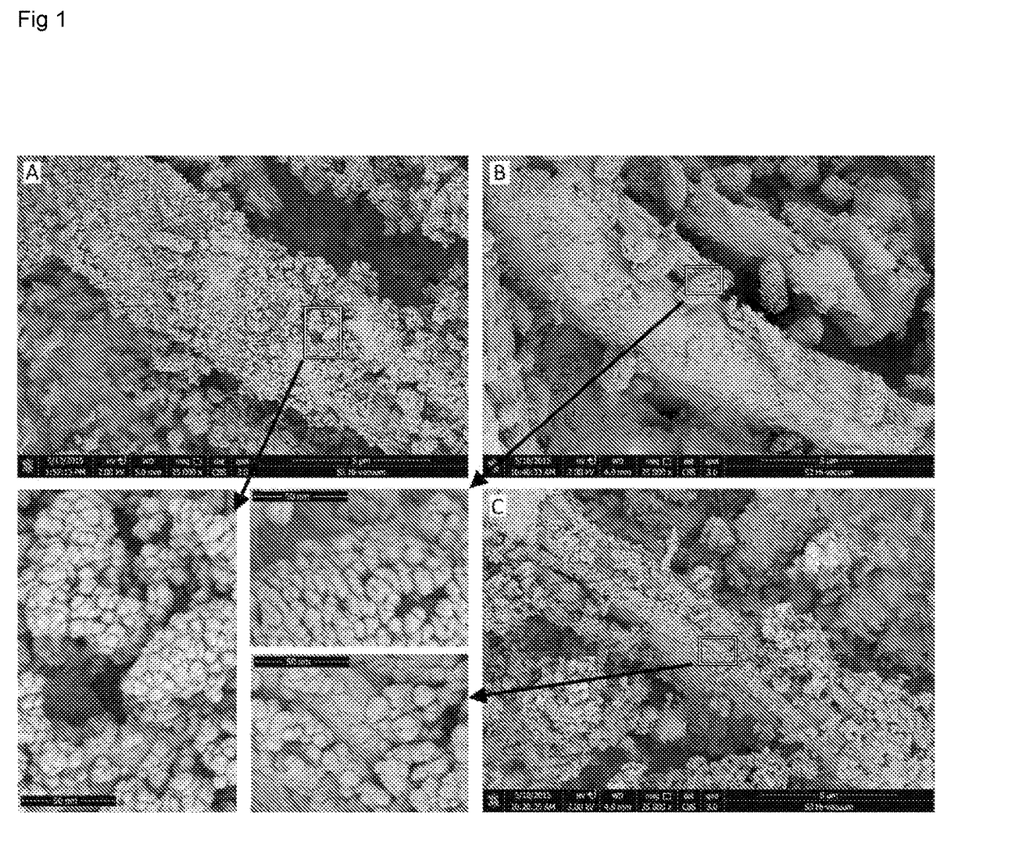
FIG. 1: $CaCO_3$ precipitated on microfiber with targeted ash of 48.2% using A) 1.0 wt-% fiber concentration and 0.5 l/min $CO_2$ feed, B) 3.0 wt-% fiber concentration and 0.5 l/min $CO_2$ feed, C) 3.0 wt-% fiber concentration and 1.5 l/min $CO_2$ feed.

FIG. 1 shows relatively large PCC particles precipitated onto the at 1.0 and 3.0 wt-% microfiber concentrations. The size of the deposited PCC particles was found to decrease with decreasing ratio of fiber (wt-%) to carbon dioxide (l/min), and with increasing fiber concentration at constant ratio. FIG. 1C shows that a substantially larger fraction of nanoparticles were nucleated and grown on the surface of the cellulose microfibers (instead of ellipsoidal $CaCO_3$ particles) at the higher fiber concentration and greater carbon dioxide feed, presumably because of the larger surface area of fiber per unit volume and the higher degree of supersaturation in the system.

Figure 2:
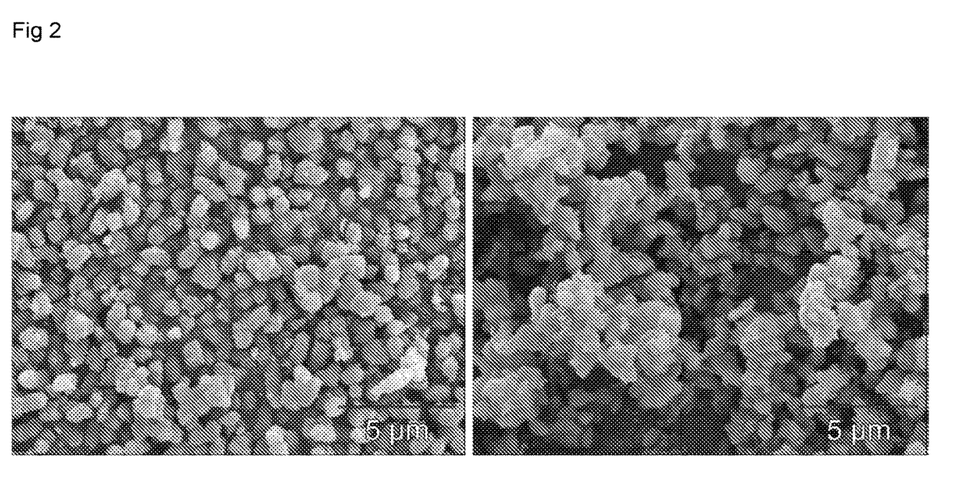
FIG. 2: SEM micrographs of the ash

Much of the difference in observed PCC particle sizes was due to aggregation and agglomeration of nano-sized crystals that form ellipsoidal particles at low microfiber concentrations, rather than to the size of individual crystals. When the fiber concentration was increased from 1.0 wt-% to 3.0 wt-% at a constant $CO_2$ feed (0.5 l/min), the morphology of the PCC particles was slightly altered and many of the particles precipitated onto the microfibers were larger (see FIG. 1B), which is attributed to more intensive agglomeration. Moreover, increasing the $CO_2$ feed from 0.5 l/min to 6.0 l/min for the suspension containing 0.5 or 1.0 wt-% microfiber did not lead to any detectable change in the morphology of the PCC particles. Instead, when the $CO_2$ feed was increased in batches containing 3.0 wt-% or more fiber, the crystal size decreased as can be seen in FIGS. 1B and 1C. Changes in aggregation and agglomeration resulted in a more even PCC distribution on the fiber surface and a better coverage of the fiber. FIG. 2 shows SEM images of ash (525±25° C.) of sample precipitated using 3.0 wt-% fiber concentration and 1.5 l/min $CO_2$ feed, with irregular PCC agglomerates.

In experiments conducted by Subramanian et al. (2007), ellipsoidal PCC structures were obtained, which are in agreement with FIGS. 1A and 1B. These ellipsoidal PCC structures, denoted colloidal PCC (c-PCC) by Subramanian et al. (2007), were obtained with a low concentration of cellulosic fines and were ascribed to the intermediate formation of ACC and its decomposition. This nucleation and crystal growth process led to a steep drop in pH (formation of ACC), immediately following by a rapid increase in pH (decomposition of ACC), and this was also observed in the present case.

FIG. 2 shows SEM micrographs of the ash obtained from the microfiber-PCC-PAA samples combusted at 525±25° C. The PCC particle morphology was similar to that of PCC precipitated onto microfiber in the absence of PAA. At low $PAA/Ca(OH)_2$ ratios, PCC particles were uniform in size with a symmetrical, spherical or ellipsoid morphology. With increasing $PAA/Ca(OH)_2$ ratio, the particles became non-uniform, developing a "molten" appearance linked with liquid precursors of $CaCO_3$ (Gower & Odom, 2000). Especially at 50 and 100 wt-% PAA concentrations, the particles formed large polycrystalline aggregates with curved shapes, also linked with the formation of crystals via PILPs and ACC (Gower & Odom, 2000).

When, at a PAA concentration of 3.0 wt-%, and the addition of $Ca(OH)_2$ was increased from 32 to 69 wt-%, no obvious differences were seen in the PCC particles on the microfibers. The morphology of the particles determined after combustion, on the other hand, showed an increase in particle regularity with increasing $Ca(OH)_2$ concentration above 41 wt-%. The particle irregularity increased when the $PAA/Ca(OH)_2$ ratio increased, which agrees with results presented by e.g. Yu et al. (2004) who concluded that $PAA/CaCO_3$ ratio has a more pronounced effect on the $CaCO_3$ morphology than on the concentration of the $CaCO_3$ formed.

Figure 3:
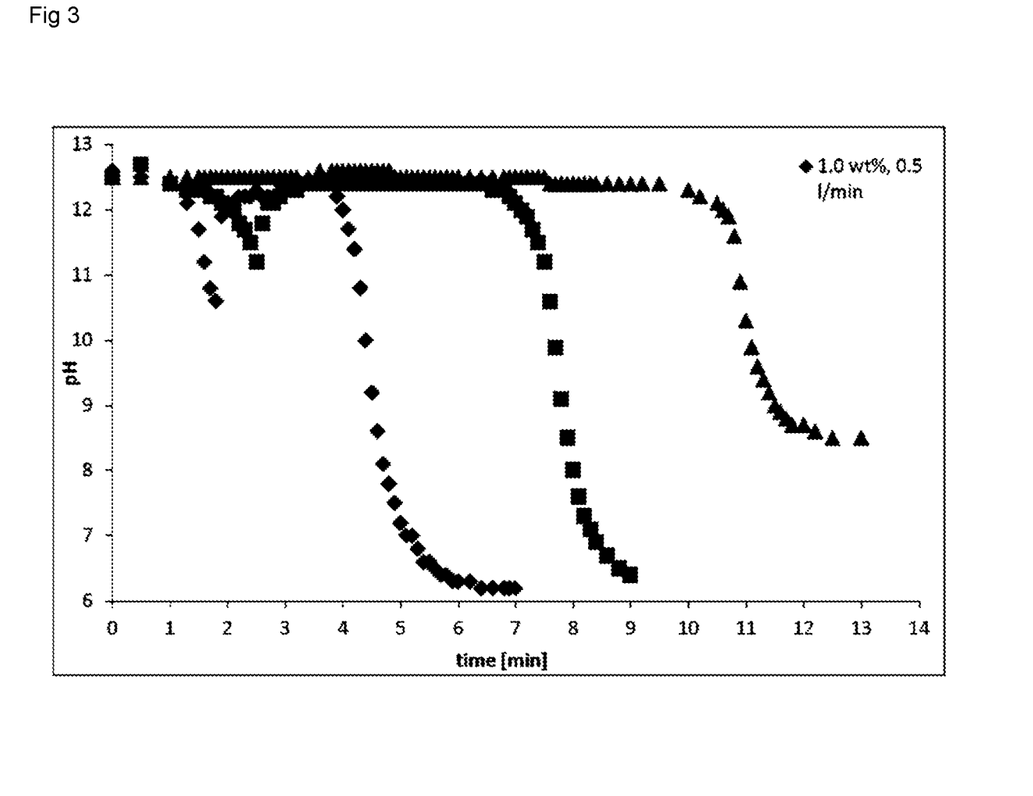
FIG. 3: pH as a function of time during carbonation of samples having different fiber concentrations

FIG. 3 shows the pH as function of time upon $CO_2$ dosage and subsequent carbonation and its dependence on the fiber concentrations. At low fiber concentration, the pH dropped quite rapidly with a constant $CO_2$ feed at the beginning of the experiment, followed by an immediate increase. The inflection point occurred later with increasing fiber concentration (when the targeted ash content was kept at constant).

The Effect of Sodium Polyacrylic Acid (PAA) as Precursor Stabilizer

The use of PAA to control $CaCO_3$ crystal morphology has been previously demonstrated (Huang et. al., 2007; Ouhenia et. al., 2008; Yu et. al., 2004), and also when $CaCO_3$ crystals were deposited on a cellulosic substrate (Hosoda & Kato, 2001; Matahwa et. al., 2008), but, to our knowledge, effect of PAA in a cellulosic fiber-$Ca(OH)_2$-$CO_2$ system has not been investigated before.

Experiments with PAA carried on using three different fiber concentrations, viz. 1.0 wt-%, 3.0 wt-% and 6.0 wt-%, with a fixed ratio of fiber to $CO_2$ of 0.5. The effects of PAA and $Ca(OH)_2$ concentration were thus varied in order to determine their impact on the complexes obtained.

Figure 4:
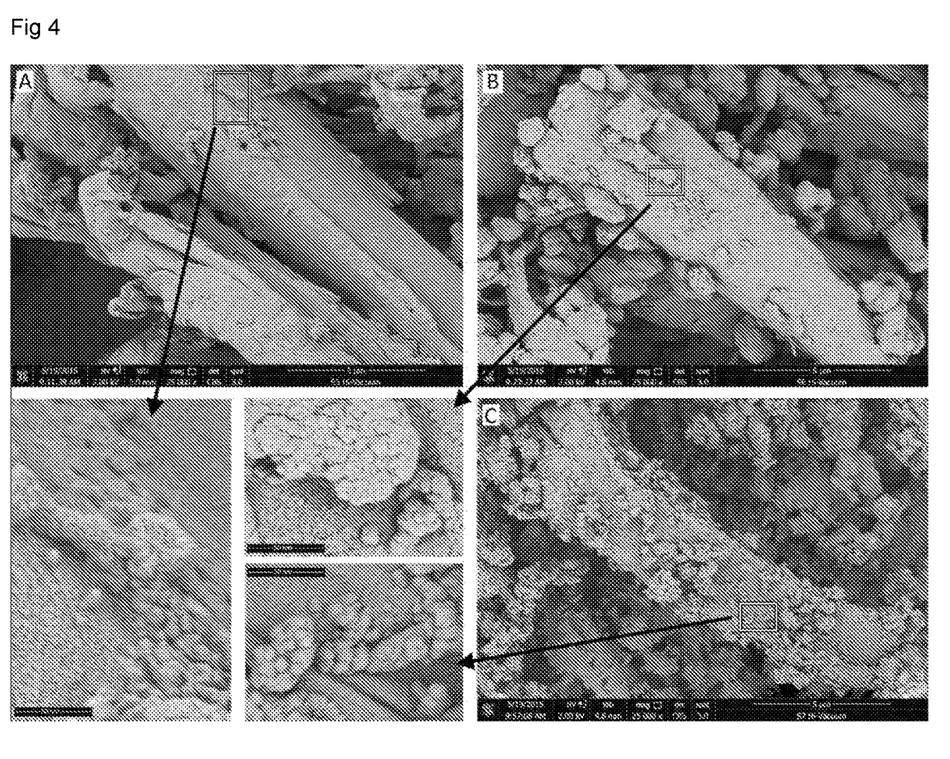
FIG. 4: $CaCO_3$ precipitated on microfiber in presence of PAA concentration: A) 100.0 wt-% B) 3.0 wt-% and C) 1.0 wt-%. The microfiber concentration was 1.0 wt-% (A), 1.0 wt-% (B), and 3.0 wt-% (C), respectively. Note that PAA concentration is given as wt-% of fiber addition (g).

The results, summarized in Table II and FIG. 4, show that at a microfiber concentration of 1.0 wt-% and a $Ca(OH)_2$ concentration of 69 wt-%, an increase in PAA concentration initially resulted in an increase in PCC particle size. The SEM images (FIG. 4) show that this was due to increased agglomeration and nanoparticle cluster formation. The ability of PAA to inhibit nucleation in bulk solution may have contributed to this process by supporting aggregate growth. The PCC particles formed were elongated and had a rice-like shape (PAA concentration 0.5 wt-%), similar to those seen in FIG. 4 C, but slightly larger. At PAA concentrations 1.0 and 3.0 wt-%, the PCC crystals were rounder, see FIG. 4B. The difference was probably caused by temporary ACC stabilization by PAA, but this was not confirmed. Matahva et al. (2008) obtained similar $CaCO_3$ particles when precipitating in presence of PAA, and these were ascribed to an ACC-PAA gel similar to that obtained by Ulčinas et al (2007). They describe the formation of a viscous ACC gel temporarily stabilized by PAA, which precipitates into more stable polymorphs after losing its stability.

Surprisingly, the effect of PAA at a microfiber concentration of 3.0 wt-% was opposite to that at 1.0 wt-%. With increasing dosage of PAA from 0.3 to 3.3 wt-%, the PCC crystal size increased, and crystals became elongated. The crystals retained their elongated shape but the crystal size increased when the PAA concentration was increased further. At very low and fixed PAA concentrations (0.06 wt-%) and a microfiber concentration of 3.0 wt-% an increase in $Ca(OH)_2$ from 32 wt-% to 69 wt-% led to a significant decrease in the PCC crystal particle size. A clear crystal phase transition region was seen at a $Ca(OH)_2$ concentration between 51 wt-% and 69 wt-%, where the particle morphology changed from approximately 1 micron roundish crystals to more elongated PCC crystals with a greater aspect ratio (length ca. 1 μm and width 0.2 μm). At 32 wt-% $Ca(OH)_2$ addition, the crystals were more elongated at a microfiber concentration of 6.0 wt-% than at 3.0 wt-%. An increase in microfiber concentration from 3.0 to 6.0 wt-% resulted in a crystal phase transition region between 32 wt-% and 51 wt-% of $Ca(OH)_2$ addition.

However, when the concentration of PAA was increased to 10.0 wt-%, it was found that the particle size and amounts of large PCC crystals and clustered PCC agglomerates deposited on the microfibers decreased significantly, but that a few individual nano-sized PCC crystal particles were still formed and present on the microfiber surface (not shown here). FIG. 4A shows that when the PAA concentration was increased further to 100.0 wt-%, crystal formation of PCC on the surface of the microfiber was inhibited, which was confirmed by a lower ash content in samples rinsed before drying.

The ash contents of some of the microfiber-PAA-$CaCO_3$ complexes (rinsed before drying) were clearly lower than unreacted $Ca(OH)_2$ should yield. This can only be explained by the removal of soluble compounds or nanocrystals in bulk solution during filtering of the samples through the 0.6 μm membrane and subsequent rinsing. A pronounced loss of crystalline material during filtration should mean that an increased dose of PAA would facilitate bulk solution precipitation, instead of decreasing it as stated frequently in the literature (Hosoda & Kato, 2001; Huang et. al., 2007; Watamura et. al., 2014).

A possible alternative is heterogeneous nucleation in bulk solution, improved by PAA addition in a manner similar to that in which the addition of PAA can improve crystallization on cellulosic fibers, i.e. via electrostatic interaction between calcium ions and anionic groups of the polyelectrolyte (PAA) and foreign particles. Bulk solution precipitation is not, however, supported by the filtrate collected in these experiments, since the filtrate was transparent, which suggests an absence of crystalline material and the presence of amorphous transparent ACC as reported in the literature (Gower & Odom, 2000; Saghavaz et. al., 2013), or a complex. The formation of an electrostatic complex between carboxyl groups and calcium ions is frequently described in the literature (Hosoda & Kato, 2001; Huang et. al., 2007; Ouhenia et. al., 2008; Ulčinas et. al., 2007; Watamura et. al., 2014), and ascribed to the formation of an ACC-containing gel (Matahwa et. al., 2008; Ulčinas et. al., 2007), suggesting that role of the PAA in the system is the stabilization of ACC or the formation of a precursor or complex, or both.

TABLE II

Results of the PCC-PAA-Microfiber experiments. PAA concentration is given as wt-% of the fiber content.

| Microfiber concentration [wt-%] | Ca(OH)₂ addition [wt-%] | PAA concentration [wt-%] | PCC morphology and size | |
|---|---|---|---|---|
| | | | Low PAA conc. | High PAA conc. |
| 1 | 69 | 0.1; 0.5; 1.0; 3.0; 10.0; 50.0; 100.0 | Elongated. | Round, irregular Reduced particle size |
| | 32; 41; 51; 60; 69 | 3.0 | Elongated | Elongated-irregular |
| 3 | 69 | 0.3; 1.0; 2.0; 3.3 | Round | Elongated Increased particle size |
| | 32; 51; 69 | 6.0 | Slightly elongated | Elongated Reduced particle size |
| 6 | 32; 51 | 1.0 | Elongated | Reduced particle size |

XRD and TGA

Ten Microfiber-PCC samples, with and without precipitated calcium carbonate, were characterized using XRD. Diffractograms were collected in the 2θ range of 13°-48°.

The XRD results show different crystalline forms of cellulose, with slight peak shifts between some of them. The main peak for cellulose located at 20-22° (Haleem et. al., 2014; Obi et. al., 2014; Tibolla et. al., 2014) was found in samples 0, 5 and 6, where it is quite sharp, but the calcite peak located at the same angle makes it difficult to reliably determine the presence of crystalline cellulose in the samples. However, a smaller peak originating from cellulose at 34.6° was clearly observed in all the diffractograms except those for samples 1 and 3. The presence of cellulose Iβ in these two samples was therefore considered as possible. In the case of the fiber reference sample, the co-existence of cellulose Iα and cellulose Iβ was suspected.

The only $CaCO_3$ polymorph observed in the samples was calcite, although some PAA with different molecular weights have been linked with the formation of aragonite in the literature (Ouhenia et. al., 2008; Watamura et. al., 2014). Calcite peaks (Kim, et. al., 2013; Kirboga et. al., 2014; López-Periago et. al., 2010) were observed in all samples except for the 0 (the fiber reference) and 5 and 6 ($Ca(OH)_2$ 69 wt-%, $CO_2$ feed 0.5 l/min and PAA concentrations 50.0 and 100.0 wt-%). The ash contents (525±25° C.) for samples 5 and 6 were 8.2 and 4.0%, respectively, confirming that samples 5 and 6 clearly contained sufficient ash to be detectable in the XRD measurement, i.e. if it were crystalline.

For sample 5 and 6, the absence of both crystalline $Ca(OH)_2$ and crystalline $CaCO_3$ suggests that the high PAA concentration in the samples led to the formation and stabilization of amorphous $CaCO_3$. The unstable character of amorphous ACC is well known, but no phase transition to a crystalline material detectable with XRD was observed, despite the long delay time between the precipitation experiments and the XRD measurements, even though particulate matter residing on the fibers was observed with SEM and the ash content of the samples showed that the concentration of inorganics was detectable with XRD, if crystalline.

TABLE III

XRD results.

| Sample number and description | | Cellulose I | PCC |
|---|---|---|---|
| Fiber reference | 0 - Microfiber, untreated | α, β | |
| No PAA | 1 - fiber 1 wt-% $CO_2$ feed 0.5 l/min | β (possible) | Calcite |
| | 2 - fiber 3 wt-% $CO_2$ feed 0.5 l/min | β | Calcite |
| | 3 - fiber 3 wt-% $CO_2$ feed 1.5 l/min | β (possible) | Calcite |
| $Ca(OH)_2$ 69 wt-% $CO_2$ feed 0.5 l/min | 4 - PAA 1.0 wt-% | β | Calcite |
| | 5 - PAA 50.0 wt-% | β | — |
| | 6 - PAA 100.0 wt-% | β | — |
| PAA 3.3 wt-% $CO_2$ feed 0.5 l/min | 7 - $Ca(OH)_2$ 32 wt-% | β | Calcite |
| | 8 - $Ca(OH)_2$ 51 wt-% | β | Calcite |
| | 9 - $Ca(OH)_2$ 69 wt-% | β | Calcite |

Table IV shows the results of the Thermogravimetric measurements. The data at 550° C. and 925° C. were used to estimate the conversion yield and possible residual $Ca(OH)_2$.

TABLE IV

TGA results

| Property | Method/basis | Unit | 1[1] | 2 | 3 | 5 |
|---|---|---|---|---|---|---|
| Dry matter (105° C.) | TGA (105° C.) | % | 98.2 | 97.72 | 97.97 | 94.87 |
| Ash content (550° C.) | TGA (550° C.) | % | 43.4 | 29.8 | 44.5 | 7.4 |
| Ash content (550° C.) | TGA (550° C.) | %, dry basis | 44.2 | 30.5 | 45.5 | 7.8 |
| Ash content (925° C.) | TGA (925° C.) | % | 25.9 | 17.3 | 25.8 | 4.6 |
| Ash content (925° C.) | TGA (925° C.) | %, dry basis | 26.4 | 17.7 | 26.4 | 4.9 |
| [$CaCO_3$] | Theoretical (TGA 550 and 925° C.) | %, dry basis | 40.6 | 29.0 | 43.4 | 6.6 |
| [$CaCO_3$] | Theoretical (TGA 550 and 925° C.) | % of ash (550° C.) | 91.8 | 95.3 | 95.5 | 85.2 |
| [$Ca(OH)_2$] | Theoretical (TGA 550 and 925° C.) | % dry basis | 4.8 | 1.9 | 2.7 | 1.5 |
| [$Ca(OH)_2$] | Theoretical | % inorganic species | 10.6 | 6.2 | 5.9 | 18.7 |

| Property | Method/basis | Unit | 6 | 10[2] | 11[3] |
|---|---|---|---|---|---|
| Dry matter (105° C.) | TGA (105° C.) | % | 97.48 | 98.02 | 98.06 |
| Ash content (550° C.) | TGA (550° C.) | % | 35.9 | 43.9 | 44.7 |
| Ash content (550° C.) | TGA (550° C.) | %, dry basis | 36.9 | 44.8 | 45.6 |
| Ash content (925° C.) | TGA (925° C.) | % | 20.5 | 25.4 | 25.9 |
| Ash content (925° C.) | TGA (925° C.) | %, dry basis | 21.0 | 25.9 | 26.4 |
| [$CaCO_3$] | Theoretical (TGA 550 and 925° C.) | %, dry basis | 36.0 | 43.0 | 43.8 |
| [$CaCO_3$] | Theoretical (TGA 550 and 925° C.) | % of ash (550° C.) | 97.6 | 96.1 | 96.0 |
| [$Ca(OH)_2$] | Theoretical (TGA 550 and 925° C.) | % dry basis | 1.2 | 2.3 | 2.4 |
| [$Ca(OH)_2$] | Theoretical | % inorganic species | 3.1 | 5.1 | 5.2 |

[1] Not taken at the end of the process and therefore holds a larger proportion of $Ca(OH)_2$
[2] Microfiber concentration 3 wt-%, PAA concentration 1.0 wt-%
[3] Microfiber concentration 3 wt-%, PAA concentration 0.3 wt-%

The results indicate that all the samples contained unreacted $Ca(OH)_2$, the amount of $Ca(OH)_2$ in the samples being typically ca. 5 wt-% of the inorganic species, with the notable exception of sample 5 which was formed in the presence of a high PAA concentration of 50 wt-%. The result is approximately in line with the conversion estimate from the TAPPI ash content measurements. The remaining $Ca(OH)_2$ was not, however, identified in the XRD analysis, suggesting either that the material was not crystalline or that it resided in $CaCO_3$ particles or microfibers, too far from the particle surfaces to be determined by the method. On the other hand, the TGA results may also interfere with the release of physisorbed water at 525° C. and at higher temperature the possible dihydroxylation of $Ca(OH)_2$ (Renaudina et. al., 2008).

In view of the above detailed description of the present invention, other modifications and variations will become apparent to those skilled in the art. However, it should be apparent that such other modifications and variations may be effected without departing from the spirit and scope of the invention.

REFERENCES

Butler M. F, Glaser N, Weaver A. C, Kirkland M, Heppenstall-Butler M, 2006. Calcium Carbonate Crystallization in the Presence of Biopolymers. Crystal growth & design, 6(3), 781-794.

Cai, G-B, Zhao G-X, Wang X-K, Yu S-H, 2010. Synthesis of Polyacrylic Acid Stabilized Amorphous Calcium Carbonate Nanoparticles and Their Application for Removal of Toxic Heavy Metal Ions in Water. Journal of Physical Chemistry C, 144, 12948-12954.

Ciobanu M, Bobu E, Ciolacu F., 2010. In-situ cellulose fibres loading with calcium carbonate precipitated by different methods. Cellulose Chemical Technology, 44, 379-387.

Cöfen H, Antonietti M. Mesocrystals and Nonclassical Crystallization. England: Chichester; 2008.

Gower L. B, Odom D. J, 2000. Deposition of calcium carbonate films by a polymer-induced liquid-precursor (PILP) process. Journal of Crystal Growth, 210, 719-734.

Haleem N, Arshadm M, Shahid M., Tahir M. A, 2014. Synthesis of Carboxymethyl cellulose from waste of cotton ginning industry. Carbohydrate Polymers, 113, 249-255.

Hardikar V. V, Matijević E, 2001. Influence of ionic and nonionic dextrans on the formation of calcium hydroxide and calcium carbonate particles. Colloids and Surfaces, 186, 23-31.

Hosoda N, Kato T, 2001. Thin-Film Formation of Calcium Carbonate Crystals: Effects of Functional Groups of Matrix Polymers. Chemistry of Materials, 13, 688-693.

Hu Z, Deng Y, 2004. Synthesis of needle-like aragonite from calcium chloride and sparingly soluble magnesium carbonate. Powder technology, 140, 10-16.

Huang S-C, Naka K, Chujo Y, 2007. A Carbonate Controlled-Addition Method for Amorphous Calcium Carbonate Spheres Stabilized by Poly(acrylic acid)s, Langmuir, 23, 12086-12095.

Huang S-C, Naka K, Chujo Y, 2008. Effect of Molecular Weights of Poly(acrylic acid) on Crystallization of Calcium Carbonate by the Delayed Addition Method, 2008. Polymer Journal, 40(2) 154-162.

Jada A., Ait Akbour R, Jacquemet C, Suau J. M, Guerret O, 2007. Effect of sodium polyacrylate molecular weight on the crystallogenesis of calcium carbonate. Journal of Crystal Growth, 306, 373-382.

Kellermeier M., Melero-García E, Glaab F, Klein R, Drechsler M, Rachel R, Garci-Ruiz J, Kunz W, 2010. Stabilization of Amorphous Calcium Carbonate in Inorganic Silica-Rich Environments. Journal of the American Chemical Society, 132, 17859-17866.

Kim H. K, Park S. J, Han J. I, Lee H. K, 2013. Microbially mediated calcium carbonate precipitation on normal and lightweight concrete. Construction and Building Materials, 38, 1073-1082.

Kirboga S, Oner M, Akoyl E, 2014. The effect of ultrasonication on calcium carbonate crystallization in the presence of biopolymer. Journal of Crystal Growth, 401, 266-270.

Kitamura M, Konno H, Yasu A, Masuoka H, 2002. Controlling factors and mechanism of reactive crystallization of calcium carbonate polymorphs from calcium hydroxide suspensions. Journal of crystal growth, 2002, 323-332.

Klungness J. H, Ahmed A, Ross-Sutherla N, AbuBakr S, 2000. Lightweight, high-opacity paper by fiber loading: filler comparison. Nordic Pulp and Paper Research Journal (15)5, 345-350.

Klungness J. H, Caulfield D, Sachs I., Tan F, Sykes M, Shilts R, 1994. Fiber-loading: a progress report. Tappi Recycling symposium (pp. 283-290). Boston: Tappi Press.

Klungness J. H, Sykes M. S, Tan F, Abubakr S, Eisenwasser, J. D, 1996. Effect of fiber loading on paper properties. Tappi Journal, 79(3), 297-301.

Klungness J. H, Tan F, Aziz S. Sykes M. S. Retention of calcium carbonate during recycling: direct loading versus fiber loading. In: Environmental Conference & Exhibit Book 1: 1997 May 5-7th; Minneapolis. Atlanta: Tappi Press; 1997.

Kumar P, Gautam S. K, Kumar V, Singh S. P, 2009. Enhancement of optical properties of bagasse pulp by in-situ filler precipitation. BioResources, 4(4), 1635-1646.

Kumar P, Singh Negi Y, Pal Singh S, 2011. Filler loading in the lumen or/and cell wall of fibers—a literature review. BioResources 6(3) 3526-3546.

López-Periago A. M, Pacciani R, Cracía-González C, Vega L. F, Domingo C, 2010. A Breakthrough technique for the preparation of high-yield precipitated calcium carbonate. Journal of Supercritical Fluids, 52, 298-305.

Malkaj P, Dalas E, Kanellopoulou D. G, Chrissanthopoulos A, Sevastos D, 2007. Calcite particles formation, in the presence of soluble polyvinyl-alcohol matrix. Powder Technology, 177, 71-76.

Matahwa H, Ramiah V, Sanderson R. D, 2008. Calcium carbonate crystallization in the presence of modified polysaccharides and linear polymeric additives. Journal of Crystal Growth, 310, 4561-4569.

Mohamadzadeh-Saghavaz K, Resalati H, & Ghasemian A., 2014. Cellulose-precipitated calcium carbonate composites and their effect on paper properties. Chemical Papers, 68(6) 774-781.

Nielsen J. W, Sand K. K, Pedersen C. S, Lakshtanov L. Z, Winther J. R, Willemoës M, Stipp S. L. S, 2012. Polysaccharide Effects on Calcite Growth: The Influence of Composition and Branching. Crystal Growth & Design, 12, 4906-4910.

Obi Reddy K, Zhang J, Zhang, J, Varada Rajulu A, 2014. Preparation and properties of self-reinforced cellulose composite films from Agave microfibrils using an ionic liquid. Carbohydrate polymers, 144, 537-545.

Ouhenia S, Chateigner D, Blekhir M. A, Guilmeau E, Krauss C, 2008. Synthesis of calcium carbonate polymorphs in the presence of polyacrylic acid. Journal of Crystal Growth, 310, 2832-2841.

Park W. K, Ko S-J, Lee S. W, Cho K-H, Ahn J-W, Han C, 2008. Effects of magnesium chloride and organic additives on the synthesis of aragonite precipitated calcium carbonate. Journal of crystal growth, 310, 2593-2601.

Payne S. R, Heppenstall-Butler M., Butler M. F, 2007. Formation of Thin Calcium Carbonate Films on Chitosan Biopolymer Substrates. Crystal Growth & Design, 7(7), 1262-1276.

Renaudin G, Bertrand A, Dubois M, Gomes S, Chevalier P, Labrosse P, 2008. A study of water releases in ground (GCC) and precipitated (PCC) calcium carbonates. Journal of Physics and Chemistry of Solids, 69, 1603-1614.

Saghavaz K. M, Resalati H, Mehrabi E, 2013. Characterization of cellulose-PCC composite filler synthesized from CMC and BSKP fibrils by hydrolysis of ammonium carbonate, Powder Technology, 246, 93-97.

Saito T, Oaki Y, Nishimura T, Isogai A, Kato T, 2014. Bioinspired stiff and flexible composites of nanocellulose-reinforced amorphous CaCO3. Material Horizons, 1, 321-325.

Silenius P. Preparation of filler containing papermaking materials by precipitating calcium carbonate in-situ in the presence of cellulosic material [Licentiate thesis]. Lappeenranta: Lappeenranta University of Technology; 1996.

Subramanian R, Fordsmand H, Paulapuro H, 2007. Precipitated calcium carbonate (PCC)-cellulose composite fillers; effect of PCC particle structure on the production and properties of uncoated fine paper. BioResources, 2(1), 91-105.

Tibolla H, Franciele M. P, Florencia C. M, 2014. Cellulose nanofibers produced from banana peel by chemical and enzymatic treatment. LWT—Food Science and Technology, 59, 1311-1318.

Ulčinas A, Butler M. F, Heppenstall-Butler M, Singleton S, Miles M. J, 2007. Direct observation of spherulitic growth stages of CaCO3 in a poly(acrylic acid)-chitosan system: In situ SPM study. Journal of Crystal Growth, 307, 378-385.

Watamura H, Sonobe Y, Hirasawa I, 2014. Polyacrylic Acid-Assisted Crystallization Phenomena of Carbonate Crystals, Chemical Engineering & Technology, 37(8), 1422-1426.

Vdović N, Kralj D, 2000. Electrokinetic properties of spontaneously precipitated calcium carbonate polymorphs: the influence of organic substances. Colloids and Surfaces, 161 499-505.

Wei H, Shen Q, Zhao Y, Zhou Y, Wang D, Xu D, 2005. On the crystallization of calciumcarbonate modulated by anionic surfactants. Journal of Crystal Growth, 279, 439-446.

Volkmer D, Harms M, Gower L, Ziegler A, 2005. Morphosynthesis of Nacre-Type Laminated CaCO3 Thin Films and Coatings. Angewandte Chemie International Edition, 44, 639-644.

Yu J, Lei M, Cheng B, Zhao X, 2004. Effects of PAA additive and temperature on morphology of calcium carbonate particles. Journal of Solid State Chemistry, 177, 681-689.

The invention claimed is:

1. A method for preparing stable amorphous calcium carbonate precipitated on natural fibers comprising the steps of:
   a. mixing water, 0 to 120 wt-% (based on the fiber weight) of at least one highly charged anionic polymer in solution, 1-99.9 wt-% (based on the total dry weight of the batch) $Ca(OH)_2$, and 0.1 to 95 wt-% (based on the total dry weight of the batch) of natural fibers;
   b. feeding $CO_2$ to the mixture of step a) while stirring to obtain a precipitation; and
   c. drying or filtering the mixture to obtain the stable amorphous calcium carbonate,
   wherein 60-80 wt-% of $Ca(OH)2$ and 40-120 wt-% of highly charged anionic polymer is used in step a).

2. The method according to claim 1, wherein the highly charged anionic polymer is polyacrylic acid or a salt thereof.

3. The method according to claim 1, wherein 0.5 to 5 wt-% of lignocellulosic fibers is used as natural fibers.

4. The method according to claim 3, wherein 0.5 to 1.5 wt-% of lignocellulosic fibers is used as the natural fibers.

5. The method according to claim 3, wherein 2.5 to 3.5 wt-% of lignocellulosic fibers is used as natural fibers.

6. The method according to claim 1, wherein the fibers used are native or a byproduct from pulping.

7. The method according to claim 1, wherein said fiber is selected from microcrystalline cellulose, microfibrillated cellulose, nanocellulose, bacteria cellulose, cellulose nanocrystals or a mixture thereof.

8. A method for preparing stable amorphous calcium carbonate precipitated on natural fibers comprising the steps of:
   a. mixing water, 40 to 120 wt-% (based on the fiber weight) of at least one highly charged anionic polymer in solution, 1-99.9 wt-% (based on the total dry weight of the batch) $Ca(OH)_2$, and 0.1 to 95 wt-% (based on the total dry weight of the batch) of natural fibers;
   b. feeding $CO_2$ to the mixture of step a) while stirring to obtain a precipitation; and
   c. drying or filtering the mixture.

9. The method according to claim 8, wherein the highly charged anionic polymer is polyacrylic acid or a salt thereof.

10. The method according to claim 8, wherein 0.5 to 5 wt-% of lignocellulosic fibers is used as natural fibers.

11. The method according to claim 10, wherein 0.5 to 1.5 wt-% of lignocellulosic fibers is used as the natural fibers.

12. The method according to claim 10, wherein 2.5 to 3.5 wt-% of lignocellulosic fibers is used as natural fibers.

13. The method according to claim 8, wherein the fibers used are native or a byproduct from pulping.

14. The method according to claim 8, wherein said fiber is selected from microcrystalline cellulose, microfibrillated cellulose, nanocellulose, bacteria cellulose, cellulose nanocrystals or a mixture thereof.

* * * * *